United States Patent [19]

Spash

[11] Patent Number: 4,884,155

[45] Date of Patent: Nov. 28, 1989

[54] SELF-LOADING HEAD ASSEMBLY FOR DISK DRIVES

[75] Inventor: John L. Spash, Harvard, Mass.

[73] Assignee: Digital Equipment Corporation, Maynard, Mass.

[21] Appl. No.: 128,802

[22] Filed: Dec. 4, 1987

[51] Int. Cl.$^4$ .............................................. G11B 5/54
[52] U.S. Cl. ................................................. 360/105
[58] Field of Search ............................... 360/104, 105

[56] References Cited

U.S. PATENT DOCUMENTS

3,488,648  1/1970  Church .................................. 360/104

Primary Examiner—A. J. Heinz
Attorney, Agent, or Firm—Fisher & Richardson

[57] ABSTRACT

A head assembly for use in connection with a disk storage unit in a digital data processing system. The head assembly maintains a bellows arrangement for loading the head, with air entrained with the disk during disk rotation filling the bellows to force the slider carrying the head into a loaded condition. The air entrained with the disk thus provides the conventional retraction force, resulting from air flow against the slider, as well as a loading force thereby ensuring balance in changes in the forces resulting from variations in speed of the air entrained with the disk.

17 Claims, 4 Drawing Sheets

SELF-LOADING HEAD ASSEMBLY FOR DISK DRIVES

FIELD OF THE INVENTION

The invention relates generally to the field of magnetic recording, and more specifically to storage of digital data on magnetic disks. In particular, the invention provides a lightweight, self-loading support assembly for a transducer, or head, which reads data from, and writes data onto, a rotating disk in a digital data processing system.

BACKGROUND OF THE INVENTION

A disk subsystem for storing data in a digital data processing system includes a rotatable disk which has a magnetic media on its surface and a transducer, or head, mounted on a movable arm. The arm positions a head assembly, which includes the head, a suspension, and other elements, near the surface of the rotating disk to enable magnetic transitions, representing data, to be recorded in, or read from, the magnetic media. The disk is divided into a plurality of tracks and sectors, with the tracks being concentric annular portions of the disk which are situated at selected radial distances from the disk's rotational center, and the sectors representing diverse angular sections of the disk's surface. To read data from, or write data onto, a particular track and sector, the arm moves the head assembly to a desired track, and the disk is rotated until the desired sector moves proximate the head. To write data onto the disk, the head is magnetized by a varying electrical current while the disk rotates to enable magnetic transitions to be recorded in the magnetic media. The pattern of transitions in the magnetic field recorded on the disk reflects the data which is being stored in the subsystem. To read the previously-recorded data from a particular track and sector, the arm moves the head assembly to the track and the disk rotates until the sector is proximate the head. The head senses the previously-recorded magnetic transitions and generates, in response thereto, a varying electrical signal. Other circuitry receives the signal and converts it to a digital data signal.

In modern disk subsystems, a head typically does not actually ride on the surface of the rotating disk, but instead is separated away from it a short distance. As a result of rotation of the disk, a boundary layer of air becomes entrained with it. In the head assembly, the head is typically mounted in a "slider" which serves as a mechanical support for the head and the electrical leads which carry electrical signals to and from the head. The slider is aerodynamically shaped so that the head effectively rides, or flies, on the air boundary layer. To regulate the distance between the head and disk, a continuous biasing force is applied to the arm which enables it to urge the head toward the disk surface. Typically, mechanical biasing members, such as springs, provide the biasing force.

Since the boundary layer which supports the head is generated by the rotation of the disk, it dissipates when the disk stops rotating. Two options are available to ensure that the head does not crash into the portion of the disk surface in which data is recorded, which can result in loss or corruption of the data. In one option, the head may be moved to a portion of the disk which is not used for recording of the data, typically to a portion interior of the innermost track. As the boundary layer dissipates, the biasing member forces the head to land on the disk surface. It will be appreciated, however, that when the disk is started up again, the disk surface can abrade the head, which, over time, can result in loss of performance. In addition, the friction between the disk and the head increases the torque requirements for the motor that rotates the disk, at least during start-up.

In the other option, the head is typically moved beyond the rim of the disk, or "unloaded", as the disk stops rotating, and is returned, or "loaded", when the drive is restarted. Typically, the am supporting the head is cantilevered from an actuator motor. During of unloading operation, the arm is moved away from the disk by a ramp, which forms part of the arm, that moves over a cam when the actuator moves the arm beyond the periphery of the disk. During the loading operation, the ramp tracks over the cam to position the arm so that the head is properly positioned over the disk.

Several problems arise with the use of the ramp and cam arrangement. First, the ramp and cam mechanism must be precisely fabricated so that the arm is properly lifted and maintained at a desired distance away from the disk surface after the head is unloaded. Furthermore, the ramp and cam also add to the torque requirements of the actuator motor during loading. Moreover, during loading of the head, there is an additional force, which is caused by the biasing spring, on the ramp and cam as the arm moves from the unloaded position to the loaded position. To ensure that the arm maintains an optimum loading speed so to minimize the possibility of overshooting the initial load position, some disk drives employ tachometers to monitor and control the velocity of the arm.

As noted above, during operation a head is separated from the disk by, essentially flying in the boundary layer of air entrained with the disk as it rotates. The force provided by the entrained air urges the head away from the disk, in opposition to the biasing force provided by the spring biasing member. The force provided by the entrained air varies with the speed of the air over the slider, which, in turn, increases with increasing distance from the rotational center of the disk. However, since the force which biases the head toward the disk is constant, the separation between the head and disk also varies with the radial distance from the disk's rotational center.

To help reduce flying height variations, some manufacturers have developed a head which includes complex contours which compensate for the radial variations in force provided by the air entrained by the disk. In such a head, the slider typically has two skids on its side proximate the disk formed parallel to the direction of disk rotation. A slightly recessed rail spans the skids to form, with the skids, an "H" configuration, to in turn form two recessed pockets on either side of the rail. A region of relative negative pressure is formed in the pocket at the trailing end of the slider, which is caused by the accelerated passage of air across the spanning cross-rail. The cross-rail essentially forms an air foil to provide a third force biasing the head toward the disk surface. Like the biasing force which forces the head away from the disk surface, this biasing force varies with increasing air speed, but it urges the head toward the disk surface. While this does help reduce variations in flying height at differing radial positions, such heads are difficult and expensive to fabricate. Furthermore, these features do nothing to minimize loading and unloading forces which are also required for such heads.

SUMMARY OF THE INVENTION

The invention provides a new and improved head assembly which minimizes variations in flying distance of the head from a rotating disk caused by variations in speed of air entrained with the disk.

The invention also provides a new and improved head assembly which requires a reduced force to load and unload the head.

In brief summary, the new head assembly includes a head mounted in a slider, which in turn is suspended from a suspension and a bellows. The slider is contoured aerodynamically as to urge an increase in separation from the disk with increasing speed of air entrained with the disk. The head assembly, is suspended from an arm which may position it proximate a rotating disk. The suspension normally provides a weak biasing force which collapses the bellows and maintains the head in a retracted position, distal from the disk surface. As the disk rotates, the bellows fills with the entrained air urging the head toward the disk surface. With the disk rotating at its operational speed, the force provided by the air pressure within the bellows balances the variable lift force provided by the air on the slider to maintain the head at a selected distance from the disk surface.

In that condition, both the force provided by the bellows urging the slider toward the disk and the force of the air on the slider urging it away from the disk are proportional to the speed of the air entrained with the disk on the head assembly to minimize variations in flying height resulting from variations in the speed of the air entrained with the disk. In addition, since the force urging the head toward the disk is provided by the air entrained with the disk rather than a spring, mechanical mechanisms, such as ramp and cam arrangements, are not necessary to load and unload the head.

BRIEF DESCRIPTION OF THE DRAWINGS

The invention is pointed out with particularity in the appended claims. The above and further advantages of this invention may be better understood by referring to the following description taken in conjunction with the accompanies drawings in which:

DETAILED DESCRIPTION OF AN ILLUSTRATIVE EMBODIMENT

Figure 1:
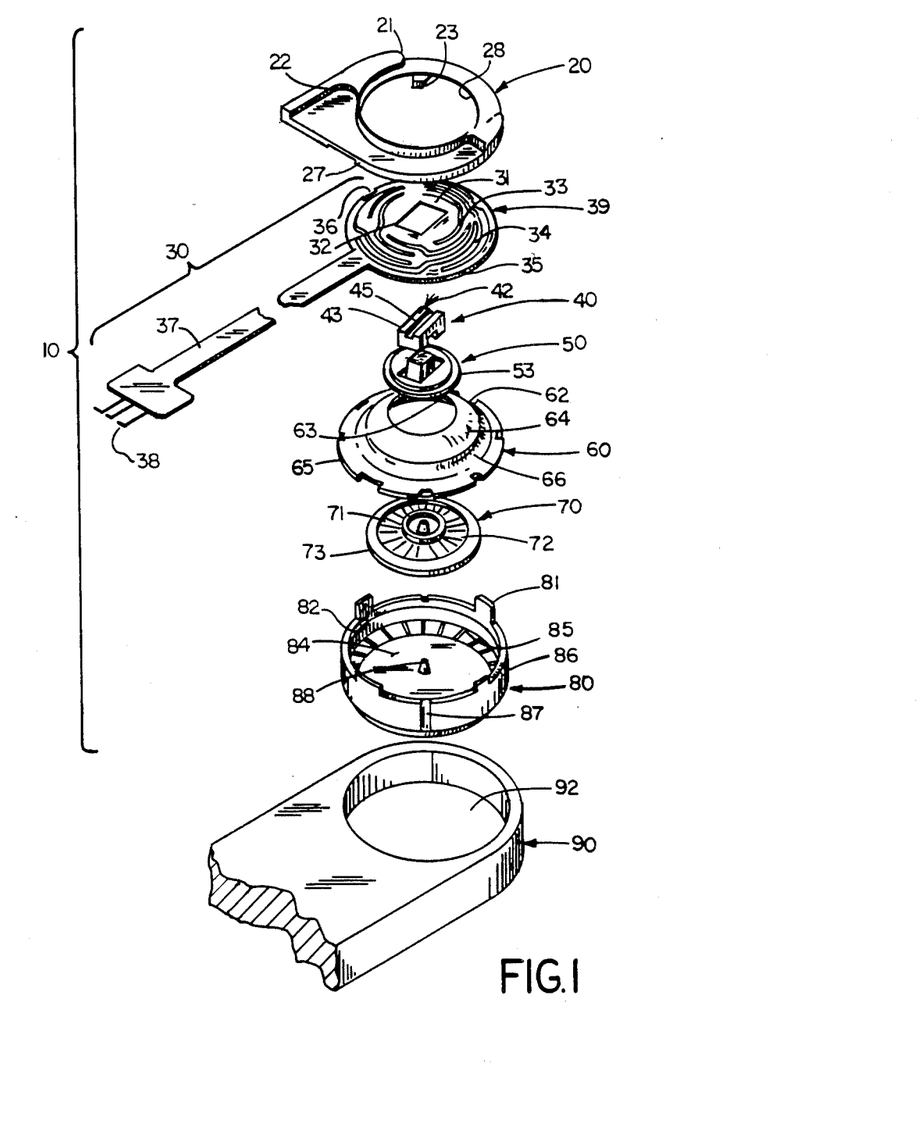
FIG. 1 is an exploded view of a head assembly constructed in accordance with the invention.
Figure 2A:
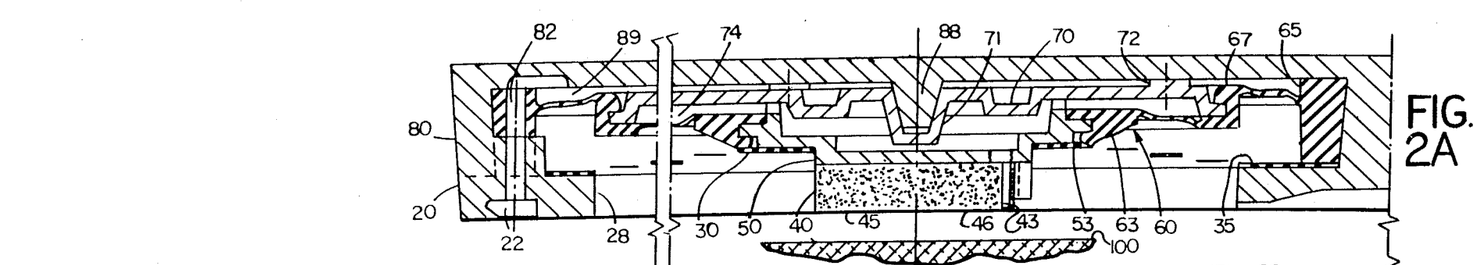
FIGS. 2A, 2B, and 2C, respectively, depict partial cross sectional views of the head assembly prior to loading, after an initial loading stage, and after the head assembly is fully loaded.
Figure 2B:
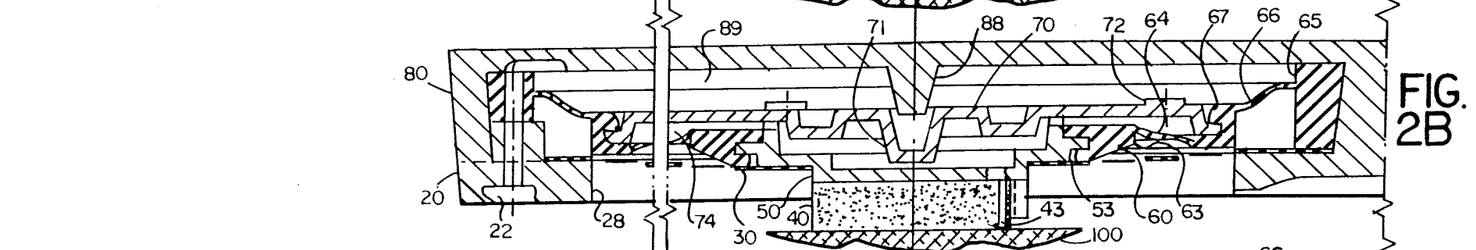
Figure 2C:
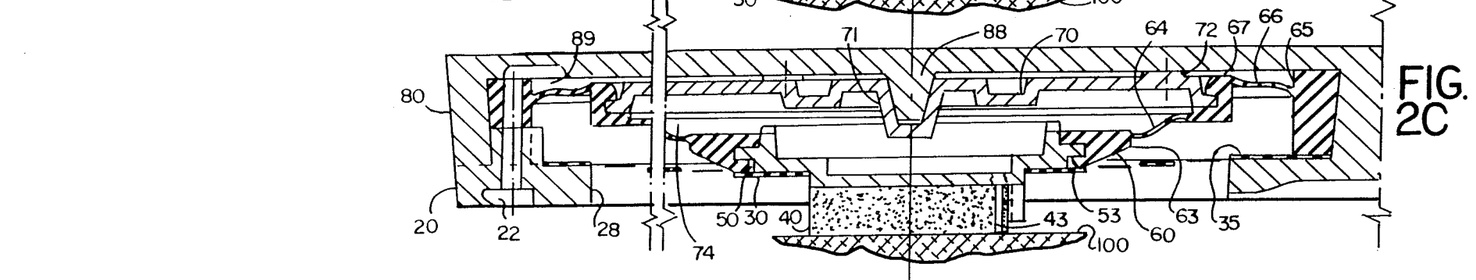

FIG. 1 depicts, in exploded form, a head assembly constructed in accordance with the invention, and FIGS. 2A, 2B and 2C depict, in various stages of operation, cross-sectional views of the head assembly. It will be appreciated from the following that FIG. 1, on the one hand, and Figs. 2A through 2C, on the other hand, depict the head in opposite orientations. That is, FIG. 1 depicts the head assembly pointed upwardly, and FIGS. 2A through 2C depict the head assembly pointed downwardly. With reference to FIGS. 1 through 2C, the head assembly 10 includes a lower housing member 20 and an upper housing member 80 which, when assembled, supports a suspension circuit 30, a slider 40 mounted on a coupling 50, and a diaphragm 60. ("Upper" and "lower" refer to the orientation of the respective components in the head assembly 10 as shown in FIGS. 2A through 2C.) The slider 40 supports a read/write head (not shown) in a conventional manner. The head assembly is supported proximate the surface of a disk 100 (FIGS. 2A through 2C) in cantilever fashion by a actuator arm 90 which is connected to a rotary or linear actuator motor (not shown). In its assembled form, the head assembly 10, and particularly the upper housing member 20, fits into a recess 92 in the arm 90 with the longitudinal axis of the slider 40 at an angle to the longitudinal axis of the arm 90 to provide optimal tangential positioning of the slider's longitudinal axis with respect to the various tracks as it moves over the disk. The actuator motor moves the arm 90 to position the head assembly 10 in a desired position adjacent a magnetic disk 100, as shown in FIGS. 2A through 2C, to permit data to be written onto, or read from, the disk 100.

The upper housing member 80 is cup-shaped, including a bottom portion 84 attached to a generally-cylindrical sidewall 6. The interior surface of bottom portion 84 defines a small conical member 88 extending downwardly from the center and a plurality of radially-extending ribs 85 proximate the sidewall 86. When assembled, the lower housing member 20 and upper housing member 80 are essentially snapped together. As shown in FIG. 1, the lower housing member 20 includes tabs 23 extending downwardly which slides down grooves 87 in the exterior of the cylindrical sidewall 86 of upper housing member 80. When the lower housing member 20 is fully mounted on the upper housing member 80, projections at the ends of the tabs 23 extend over bottom portion 84 of the upper housing member 80 to clamp them together.

The lower housing member 20 includes a circular interior periphery 28 which defines an interior circular opening through which the slider is loaded and unloaded. When the lower housing member 20 and upper housing member 80 are snapped together, a rim 65 of diaphram 60 and a rim 35 of suspension circuit 30 are clamped between the interior periphery of the lower housing member 20 and the upper housing member 80, as shown in FIGS. 2A through 2C. The upper housing member 80 may include keys 81 which extend through notches 62 in the rim 65 of the diaphragm and prevent the diaphragm from rotating when mounted on the upper housing member 80 and to ensure that the elements are properly aligned.

The exterior surface of the lower housing 20 includes a raised semi-circular portion extending partially around the interior periphery 28 which defines an outwardly-extending lip 27. At one end of the lip 27, the raised portion defines a scoop 22. When the head assembly 10 is mounted in the recess 92 of arm 90, both the lip 27 and scoop 22 are oriented toward the leading edge of the interior periphery 28 of the lower housing 20, that is, toward the direction of the flow of air entrained with the disk 100.

The diaphragm 60 generally includes two flexible annular membranes, including an interior annular membrane 64 and an exterior annular membrane 66. The interior annular membrane 64 and exterior annular membrane 66 are separated by an annular grooved member 67, in which pressure plate 70 is mounted. More specifically, the pressure plate 70, which is circular, includes an outer rim 73 which fits into the annular grooved member 67 in sealing engagement. The pressure plate 70 includes, a plurality of radiallyextending ribs 72 on its lower surface, that is, the surface directed away from the bottom portion 84 of the upper housing member 80 when mounted in the diaphragm 60. In addition, the center of the upper surface of pressure plate 70 defines a conical depression 71 and a plurality of upwardly-extending dimples 72.

The diaphragm 60 also includes an interior annular grooved member 63, which forms the interior rim of the interior annular membrane 64. The interior annular grooved member 63 receives the coupling 50, with rim 53 of the coupling 50 fitting into the interior grooved member 63 in sealing engagement. The slider 40 is cemented onto the coupling 50.

The suspension circuit 30 performs several functions in the head assembly 10. First, as will be explained below primarily in connection with FIG. 4, the suspension circuit 40 provides electrical conduction paths between wires 42 extending from the head mounted on slider 40 and drive electronics (not shown). In addition, the suspension circuit 30 provides a small biasing force which urges the slider 40 into a retracted position away from the disk. As shown in FIG. 2A, the suspension circuit 30 includes a rectangular opening defined by an inner rim 31, which surrounds the slider 40 and contacts the coupling 50. The suspension circuit is not formed in a planar condition but instead in a condition such it urges the coupling 50 toward the upper housing member 80, that is, toward a retracted position away from the disk 100. The suspension circuit 30 also inhibits lateral motion by the slider 40 with respect to the arm 90 during seek operations and yaw, that is, rotational motion by the slider around an axis orthogonal to the disk.

It will be appreciated that the elements of the head assembly essentially define two bellows. In particular, the upper housing member 80, outer annular membrane 66 of diaphragm 60 and pressure plate 70 define an upper bellows having an upper air chamber 89. In addition, the pressure plate 70, inner annular membrane 64, and coupling 50 define a lower bellows having a lower air chamber 74. An air passage 82 is defined from air scoop 22 in the lower housing member 20, and through rim 65 of diaphragm 60 and upper housing member 80 to permit air passage into and out of the upper air chamber 89. As will be described below, the air scoop 22 which, when the head assembly 10 is mounted in arm 90, is pointed in the direction to intercept air entrained with the rotating disk 100, directs the intercepted air into the upper air chamber 89.

Figure 3:
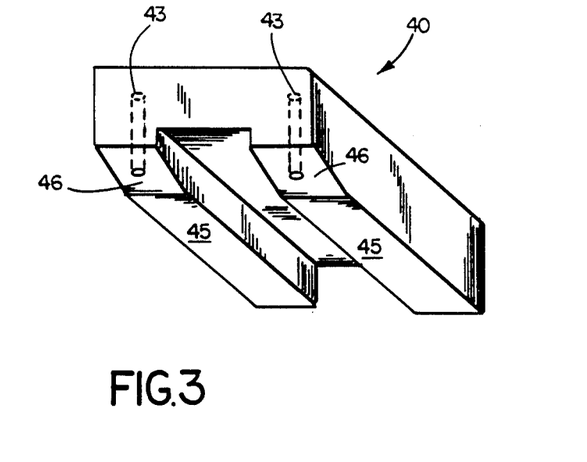
FIG. 3 is a detailed perspective view of a slider forming part of the head assembly.

Similarly, air passages 43 formed in the slider 40 and coupling 50 permit air to pass into and out of the lower air chamber 74. As shown in greater detail in FIG. 3, the slider 40 includes two skids 45 each of which terminates in an inclined ramp 46. Each ramp 46 defines an opening for an air passage 43. In the head assembly 10, the ramps 46 face the direction of flow of air entrained with the disk 100 and act as air scoops for directing air entrained with the disk into the air passages 43 and, thus, into the lower air chamber 74.

FIGS. 2A, 2B and 2C depict the assembled head assembly 10 at three diverse points in the operation of loading. FIG. 2A depicts the head assembly 10 prior to or at the beginning of loading, in which the slider 40 is in a fully retracted position, maintained in that condition by the suspension circuit 30. In that condition, the conical projection 88 in the upper housing member 80 mates with the conical depression 71 formed in the pressure plate 70 to minimize sideways movement of the pressure plate 70 relative to the upper housing member 80. The inner membrane 64 and outer membrane 66 of diaphragm 60 are somewhat folded or convoluted and the ribs 85 and 72 are provided in the bottom portion of upper housing member 80 and pressure plate 70, respectively, to minimize the amount of surface area of the upper housing member and pressure plate which the convolutions might touch in this condition, so as to minimize any potential adhesion between the diaphragm and pressure plate 60 and bottom housing member 80.

When the disk 100 begins rotation, air proximate the disk becomes entrained with it. The air flows across the lip 21, which operates as a cross-rail to deflect the air moving across the opening defined by the inner periphery 28 of the lower housing member 20. The deflection of the air by the lip 21, by the Bernoulli effect, causes a lowering in the air pressure proximate the exposed surface of the diaphragm 60. In addition, the air scoop 22 in the lower housing member 20 intercepts air entrained with the disk directs it through air passage 82 and into the upper air chamber 89 to increase the air pressure therein. As a result, a pressure gradient is established between the upper air chamber 89 and the exposed surface of the diaphragm 60, which provides a preliminary loading force in opposition to the weak retraction force provided by the suspension circuit 30. When the loading force exceeds the weak retraction force provided by the suspension circuit the pressure plate moves toward the disk 100, to an intermediate position depicted in FIG. 2B, carrying with it the inner annular membrane 64, coupling 70 and slider 40 with the read-/write head. Convolutions in the outer membrane 66 unfold to permit the pressure plate 70, inner annular membrane 64, coupling 70 and slider 40 to descend toward the disk 100 without stretching the outer membrane 66.

In the intermediate position depicted in FIG. 2B, the head assembly has several sources of retraction forces which urge the slider to the retracted position, including the suspension circuit 30 and the movement of air entrained with the disk against the slider 40, and particularly the skids 45 and ramps 46. The suspension circuit 30 is designed to provide a very weak retraction force, sufficient to overcome gravity and retract the slider 40 when the disk is not rotating. The primary source of retraction force is lift provided by the movement of air entrained with the disk against the skids 45 of slider 40, which is generally proportional to the speed of air across the skids.

At the intermediate position, as shown in FIG. 2B the slider is close to the surface of disk 100, but it is not yet fully loaded. A second loading stage begins to move the slider 40, and thus the head carried thereby, from the intermediate position to the fully loaded position proximate the surface of disk 100. This condition is depicted in FIG. 2C. With reference initially to FIG. 2B, it will be appreciated that with the slider 40 in the intermediate position the pressure of the entrained air is greater than when in the fully retracted position (FIG. 2A). The increase in pressure causes air to propagate through the air passages 43 in slider 40 and into the lower air chamber 74, increasing the air pressure in the lower air chamber 74. The increasing air pressure in lower air chamber 74 at some point provides a force on the coupling 50 which exceeds the retraction force provided by the lift force of the entrained air moving against the slider 40 forcing the slider 40 to move closer to the disk 100 to the fully loaded position. In that operation, the convolutions in the inner membrane 64 unfold, permitting the movement without stretching the inner membrane 64. At the fully loaded position, the sum of the weak retraction force provided by the suspension circuit 30 and the lift force of the entrained air on the skids 45, both of which urge the slider away from the disk, balances the opposing force provided by the increased air pressure in lower air chamber 74 on the coupling 50.

The air pressure in lower chamber 74 is substantially larger than the air pressure in upper chamber 89. Accordingly, as the increasing air pressure in lower air chamber 74 causes the slider 40 to descend toward the disk 100, it also provides a force on the pressure plate 70 which exceeds the force provided by the pressure in the upper air chamber 89, urging the pressure plate 70 to return to its retracted position adjacent the upper housing member 80, with rear feet 72 abutting the interior of bottom portion 84 of the upper housing member 80. In the process, the air in chamber 89 is exhausted through the air passage 82. In that position, the locating cones 71 and 88 are in their mated condition to inhibit lateral movement of the pressure plate 70 relative to the upper housing member 80.

At the end of the second loading stage, the slider 40 will be fully loaded to a position very close to the surface of disk 100. The slider is limited in its descent toward the disk 100 primarily by the lift force provided by flow of air entrained with the disk 100 against the skids 45. It will be appreciated that the loading force provided by the air pressure in air chamber 74 on coupling 50 is, like the lift force due to the movement of the entrained air against the skids 45 of slider 40, proportional to the speed of the air entrained with the disk against the skids 45. Accordingly, when the arm 90 moves the head assembly 10 over the disk, the change in the lift force caused by the change in the speed of air moving against skids 45 will be matched by the change in the loading force provided by the air pressure in chamber 74.

It will be appreciated by those skilled in the art that, while the openings of air passages 43 may be located in many positions in the ramps 46 and in skids 45, it is preferable that they be located in ramps 46 some distance from the edges of the ramps 46. Since sliders 40 are generally fairly small, it is desirable to place the openings of the air passages 43 where pressure variations as a result of positional variations are minimized; thus, it is desirable that the openings not be near the edges of the ramps 46, where pressure variations can be quite large. Further, it is undesirable to locate the openings of the air passages 43 in the skids 45 since the skids 45 may scrape across the surface of disk 100 and the passages may become clogged from particulate matter dislodged from the disk.

As described above, the suspension circuit 30 provides electrical conductors for carrying signals to and from the head mounted on slider 40, as well as providing a weak force to enable the slider to retract When the disk stops rotating. The electrical conductors provided on the suspension circuit are affixed to the suspension circuit, and are not loose wires which are typically used and which can cause the slider to be in a skewed orientation relative to the disk. The suspension circuit 30 includes printed conductive paths which effectively eliminates skewing forces on the slider 40.

The suspension circuit 30 is also configured to permit the slider 40 to pitch and roll to conform to variations in the disk surface, but to limit yawing of the slider 40. That is, the suspension circuit 30 permits the slider 40 to pivot around axes parallel to the general plane of the disk surface to permit it to conform to the instantaneous orientation of the disk surface, which may not be perfectly planar, but to constrain the slider 40 from pivoting around an axis orthogonal to the disk surface which can cause the slider 40 to be positioned slightly off track or wobble along a track. As is well known in the art, excessive yaw of a slider can cause track positioning problems and deficiencies in the signal read from or written onto the disk.

Figure 4:
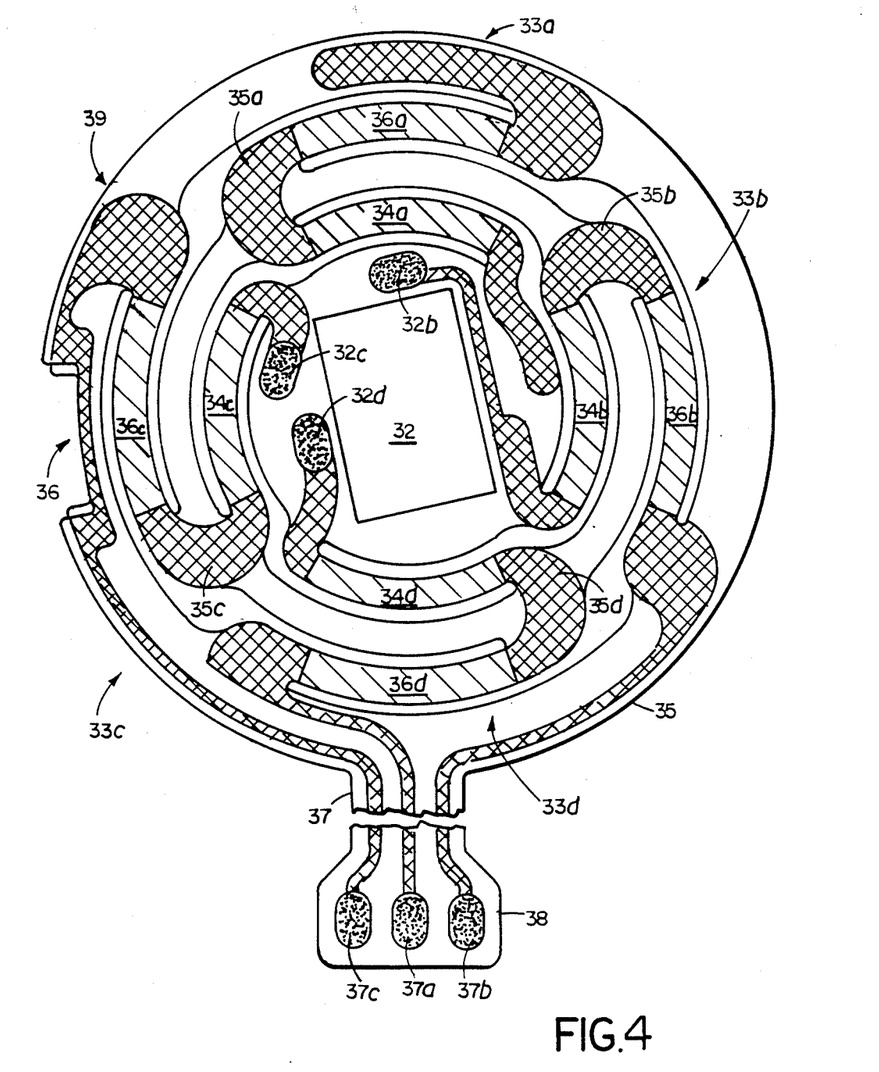
FIG. 4 is a plan view detail of a suspension circuit forming part of the head assembly.

The suspension circuit 30 is depicted in FIG. 1 and in detail in FIG. 4. With reference to these Figs., the suspension circuit 30 includes a frame 39 and a connector 38 which connects to electrical equipment (not shown), that are interconnected by an elongated strip 37. The frame 39 includes the outer rim 35 and inner rim 31. The outer edge of the rim 35 defines a notch 36 which accommodates the portion of the upper housing 20 defining air passage 82. The inner rim 31 defines the rectangular opening 32 which fits on the coupling 50 just around the slider 40 as described above. The opening 32 should be dimensioned to fit around the slider 40. The inner rim 31 is cemented to the coupling 50 around the slider 40 to inhibit the slider 40 from yawing.

The inner rim 31 is connected to and spaced apart from the outer rim 35 by a series of arm elements generally identified by reference numerals 34 through 36, organized in a series of generally concentric tiers. The suspension circuit includes four sets of arm elements 33a through 33d, with each set being identified by a letter "a" through "d". The arms 34a, 35a and 36a and arms 34c, 35c and 36c are on opposing sides of the inner rim 31, and arms 34b, 35b and 36b and arms 34d, 35d and 36d are on opposing sides of the inner rim 31. The sets of arms 34 through 36 combine essentially to form a spring which permits the inner rim 31 to move relative to the outer rim 35 with application of a force by the coupling 50 (FIG. 1).

In addition, if in response to an imperfection in the disk surface the slider pivots around an axis generally parallel to the direction of the disk surface, that rotation will be reflected in the forces applied to the skids 45 of the slider, enabling it to pivot. The coupler 50 pivots in response causing a pivoting of the inner rim 31 of the suspension circuit 30. As a result, the arms 34 through 36, and particularly the arms 34 which form the inner tier, bend or curve slightly to permit the pivoting of the inner rim 31. Thus, the suspension circuit 30 permits the orientation of the slider to conform closely to the contours of the disk surface, permitting the slider to be situated more closely to the disk surface than could otherwise be achieved.

As noted above, the suspension circuit 50 also provides electrical conductors which allow electrical current to pass to and from the read/write head (not shown) mounted on slider 40. The base material of suspension circuit 50 is preferably an insulating material, such as Kapton, on which has been printed or otherwise deposited conductive material in a number of strips 37b through 37d which corresponds to the number of connections which the head requires. The conductive strips 37b through 37d extend between the connector 38 and over strip 37 and portions of frame 39 as shown in cross-hatching in FIG. 4. In particular, as shown in FIG. 4 the conductive strips extend over arms 34 and 36 in sets 33b through 33d, which are proximate the strip 37. The conductive strips 37c through 37d terminate in bonding pads 32b through 32d which connect to wires 42 from the read/write head (not shown). When the head assembly 10 is mounted on arm 90 (FIG. 1), the strip 37 extending from frame 39 may be affixed to the arm 90 to secure it from dangling and possibly yanking the head assembly as the arm 90 rapidly moves the head over the surface of the disk 100.

Although not necessary to carry current to or from the read/write head (not shown) mounted on slider 40, one embodiment of the suspension circuit 30 also includes a strip 33a deposited on arms 34a and 36a and on the proximate portions of the inner rim 31 and outer rim 35. This additional strip 33a is provided to balance the mass of the strips deposited on the other sets 33b through 33d and to ensure that the stiffness of the arms 34a through 36a of set 33a is the same as the stiffness of the corresponding arms of the other sets 33b through 33d.

The head assembly 10 provides a number of advantages. In the past, to permit a slider to pitch or roll the slider has pivoted around a dimple. The positioning of the dimple has been very critical, since if the center of rotation is not precisely balanced, the slider could load at an undesirable pitched or rolled angle with respect to the disk. The head assembly 10 constructed in accordance with the invention eliminates this problem, since the slider is rigidly mounted to the other components of the head assembly and pitching and rolling is facilitated by the flexible inner membrane 64 and suspension circuit 30.

In addition, in the past wires from the head have been curled in a service loop and run along the arm 90 to the disk's electronic equipment. The service loop essentially formed a spring which could cause the slider to affect a pitched or rolled orientation if not properly positioned. The suspension circuit 30 effectively eliminates the need for the service loop.

It will be appreciated that the head assembly 10 constructed in accordance with the invention provides that the loading force resulting from the air pressure in air chamber 74 is provided by the same source as the retraction force of the air movement against slider 40. As a result, the head assembly maintains the slider 40 at a constant distance from the surface of the disk 100 regardless of the variation in speed of the entrained air over the disk surface. The head assembly 10 accomplishes this without requiring the complicated fabrication required of prior sliders, thereby achieving the result at a decreased cost of manufacture.

It will also be appreciated that, although the illustrative embodiment described herein has been described as having two air chambers 74 and 89, depending on the distance from which loading begins the head assembly may only require a single air chamber. If a single air chamber is used, it is preferable that the air pressure for the air chamber be provided from the skid or ramp of the slider, since that is also the location at which the lift force is generated. If the air pressure for the air chamber reflects the air pressure at the skid or slider, the variations in the lift force due to variations in air pressure at that point will be reflected in the air pressure in the air chamber. Accordingly, variations in the air pressure caused by variations in air speed as the slider moves from track to track across the disk will not cause variations in the flying height of the slider over the disk.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A head assembly for supporting a slider, including at least one lead extending therefrom for carrying an electrical signal, in a loaded position juxtaposed a rotating disk comprising:
    A. an expandable bellows having a rigid upper housing member adapted to be mounted on an actuator arm and a flexible lower diaphragm member affixed in sealing relationship thereto to form an airtight seal to form an air chamber, said slider being mounted on said diaphragm member sidewall and an opposed sidewall for supporting said slider, said bellows having an expanded condition in which it supports said slider proximate said disk and a collapsed condition in which it supports said slider distal said disk;
    B. retraction means connected to said bellows for urging said bellows to its collapsed condition, said retraction means comprising:
        i. an outer frame mounted on said upper housing member;
        ii. an inner frame positioned adjacent said diaphragm member proximate said slider; and
        iii. an arm network connected to said outer frame and said inner frame, said arm network comprising a plurality of pairs of flexible arms situated symmetrically around said slider adapted to permit said slider to pivot around axes parallel to said disk surface but not around axes orthogonal to said disk surface permitting said inner frame to move relative to said outer frame as said bellows expands while maintaining a restoring force thereon;
        said outer frame, said inner frame and said arm network all including an electrically-insulating outer surface, said retraction means further comprising at least one electrical conductor formed thereon extending between said outer frame to said inner frame over said arm network adapted to be connected to said lead; and
    C. air interception means connected to said bellows for intercepting air entrained with said disk and directing it into said bellows to facilitate expansion of said bellows.

2. A head assembly for supporting a slider in a loaded position juxtaposed a rotating disk comprising:
    A. expandable bellows means having a rigid upper housing member adapted to be mounted on an actuator arm and a flexible lower diaphragm member affixed in sealing relationship thereto to form an airtight seal to form an air chamber, said slider being mounted on said diaphragm member sidewall and an opposed sidewall for supporting said slider said bellows means having an expanded condition in which it supports said slider proximate said disk and a collapsed condition in which it supports said slider distal said disk;

B. retraction means connected to said bellows means for urging said bellows to its collapsed condition; and C. air interception means connected to said bellows means for intercepting air entrained with said disk and directing it into said bellows means to facilitate expansion of said bellows means.

3. A head assembly as defined in claim 2 further comprising a lower housing member including means for clamping said diaphragm member to said upper housing member.

4. A head assembly as defined in claim 3 wherein said lower housing member includes lip means adapted to be positioned to deflect flow of air entrained with the disk to enable a lowering of air pressure on the exposed surface of said diaphragm member.

5. A head assembly as defined in claim 4 in which said air interception means includes air passage means defined in upper housing member and terminating in said air chamber and air scoop means defined in said lower housing member for directing air entrained with said disk into said air passage means and thence into said air chamber.

6. A head assembly as defined in claim 2 wherein said air interception means includes air passage means defined in said slider and directed toward said entrained air to direct said entrained air into said air chamber.

7. A head assembly as defined in claim 2 said diaphragm member includes outer membrane means and inner membrane means separated by pressure plate mounting means, said head assembly further comprising pressure plate means in sealing engagement with said pressure plate mounting means to form a lower air chamber proximate said slider and an upper air chamber proximate said upper housing member, said air interception means directing said air into both said lower air chamber and said upper air chamber.

8. A head assembly as defined in claim 7 wherein said air interception means includes:

A. upper chamber air directing means for directing air entrained with said disk into said air chamber; and B. lower chamber air directing means defined in said slider for directing air entrained with said disk into said lower air chamber.

9. A head assembly as defined in claim 8 wherein said lower housing member includes lip means adapted to be positioned to deflect flow of air entrained with the disk to enable a lowering of air pressure on the exposed surface of said diaphragm member.

10. A head assembly as defined in claim 2 wherein said retraction means includes spring means mounted on said upper housing member and adjacent said diaphragm member for urging said bellows in a collapsed condition.

11. A head assembly as defined in claim 10 wherein said retraction means includes:

A. outer frame means for mounting on said upper housing member;

B. inner frame means positioned adjacent said diaphragm member proximate said slider; and C. arm network means connected to said outer frame means and said inner frame means, said arm network means comprising a plurality of flexible arms permitting said inner frame means to move relative to said outer frame means as said bellows expands while maintaining a restoring force thereon.

12. A head assembly as defined in claim 11 wherein said arm network means includes a plurality of arms situated symmetrically around said slider adapted to permit said slider to pivot around axes parallel to said disk surface but not around axes orthogonal to said disk surface.

13. A head assembly as defined in claim 11 wherein said arm network means includes a plurality of pairs of arms situated symmetrically around said slider adapted to permit said slider to pivot around axes parallel to said disk surface but not around axes orthogonal to said disk surface.

14. A head assembly as defined in claim 11 wherein said slider includes at least one lead extending therefrom for carrying an electrical signal, and wherein said outer frame means, said inner frame means and said arm network means all include an electrically-insulating outer surface, said retraction means further comprising at least one electrical conductor formed thereon extending between said outer frame means to said inner frame means over said arm network means adapted to be connected to said lead.

15. A head assembly as defined in claim 14 wherein said head assembly is adapted to be mounted on an elongated arm to position said head assembly over said disk, said retraction means including elongated strip means extending from said outer frame means, said elongated strip means having formed thereon an electrical conductor connected to the electrical conductor formed on said outer frame means adapted to carry the electrical signal between said lead and external processing circuitry.

16. A head assembly as defined in claim 14 wherein said arm network means includes a plurality of arms situated symmetrically around said slider, said retraction means including a plurality of electrical conductors formed on said arm network means symmetrically around said slider.

17. A head assembly for supporting a slider in a loaded position juxtaposed a rotating disk comprising:

A. an expandable bellows for supporting said slider, said bellows having an expanded condition in which it supports said slider juxtaposed said disk and a collapsed condition in which it supports said slider distal said disk, said bellows having:

i. a rigid upper housing member adapted to be mounted on an actuator arm;

ii. a flexible diaphragm member, said diaphragm member comprising:

(a) an outer membrane having an outer periphery in sealing relationship with said upper housing member and an inner membrane having a slider mounting for receiving said slider, said outer membrane and said inner membrane being separated by pressure plate mounting means, and (b) a pressure plate in sealing engagement with said pressure plate mounting means to form, with said inner membrane a lower air chamber proximate said slider and, with said outer membrane and said upper housing member, an upper air chamber proximate said upper housing member, iii. a lower housing member including means for clamping said diaphragm member to said upper housing member, said lower housing member including a lip adapted to be positioned to deflect flow of air entrained with the disk to enable a lowering of air pressure on the exposed surface of said diaphragm member;

B. retraction means connected to said bellows for urging said bellows to its collapsed condition, said retraction means being mounted on said upper housing member and adjacent said diaphragm member for urging said bellows in a collapsed condition and comprising:
  i. an outer frame mounted on said upper housing member;
  ii. an inner frame positioned adjacent said diaphragm member proximate said slider; and
  iii. an arm network connected to said outer frame and said inner frame, said arm network comprising a plurality of flexible arms permitting said inner frame to move relative to said outer frame as said bellows expands while maintaining a restoring force thereon;

c. air interception means comprising:
  i. upper chamber air directing means for directing air entrained with said disk into said upper air chamber; and
  ii. lower chamber air directing means defined in said slider for directing air entrained with said disk into said lower air chamber.

* * * * *